(12) United States Patent
Zhang

(10) Patent No.: US 10,946,876 B2
(45) Date of Patent: Mar. 16, 2021

(54) CONNECTED TRANSPORTATION NETWORK SYSTEM

(71) Applicant: Xiaohua Zhang, Beijing (CN)

(72) Inventor: Xiaohua Zhang, Beijing (CN)

(73) Assignee: Xiaohua Zhang

( * ) Notice: Subject to any disclaimer, the term of this patent is extended or adjusted under 35 U.S.C. 154(b) by 390 days.

(21) Appl. No.: 16/087,648

(22) PCT Filed: Mar. 31, 2017

(86) PCT No.: PCT/CN2017/079069
§ 371 (c)(1),
(2) Date: Sep. 23, 2018

(87) PCT Pub. No.: WO2017/173958
PCT Pub. Date: Oct. 12, 2017

(65) Prior Publication Data
US 2019/0106124 A1    Apr. 11, 2019

(30) Foreign Application Priority Data

Apr. 8, 2016   (CN) .......................... 201610218801.4
Apr. 8, 2016   (CN) .......................... 201620293606.3

(51) Int. Cl.
*B61B 1/02*   (2006.01)
*B61B 13/12*  (2006.01)
*B61B 1/00*   (2006.01)
(52) U.S. Cl.
CPC .............. *B61B 13/127* (2013.01); *B61B 1/00* (2013.01); *B61B 1/02* (2013.01)

(58) Field of Classification Search
CPC ............ B61B 1/00; B61B 1/02; B61B 13/127
See application file for complete search history.

(56) References Cited

U.S. PATENT DOCUMENTS 1,515,251 A * 11/1924 Graves ...................... E01C 1/04
                                                        104/27
1,748,309 A *  2/1930 Rose ........................ B61B 1/02
                                                        104/28
(Continued)

FOREIGN PATENT DOCUMENTS

CN           1110234          10/1995
CN          101628583          1/2010
(Continued)

*Primary Examiner* — Scott A Browne
(74) *Attorney, Agent, or Firm* — Treasure IP Group, LLC

(57) ABSTRACT

Disclosed is an interconnected transportation network system, wherein same is related to the field of transportation facilities and control, and comprises a main transportation system, a transfer system and an entry/exit system. The main transportation system is formed of a closed annular rail vehicle, and the annular train moves continuously on a T-shaped track to fulfil a passenger transportation task by means of multi-point drive. The transfer system (intercommunication) is of the same structure as that of the main transportation system, and the passengers transfer between main transportation lines by means of the transfer system. The entry/exit system (terminal) is formed of an annular buffer vehicle system and a stepping speed control system, and the passengers enter or exit the main transportation lines in a self-service manner by means of the entry/exit system.

6 Claims, 6 Drawing Sheets

(56) References Cited

U.S. PATENT DOCUMENTS

| | | | | |
|---|---|---|---|---|
| 2,657,642 A | * | 11/1953 | Babcock | B61B 1/02 104/28 |
| 3,675,584 A | * | 7/1972 | Hall | B61B 1/02 104/28 |
| 2013/0213254 A1 | * | 8/2013 | Dai | B61B 1/02 104/130.01 |

FOREIGN PATENT DOCUMENTS

| | | | | |
|---|---|---|---|---|
| CN | 102774384 | | 11/2012 | |
| CN | 203511638 | | 4/2014 | |
| CN | 106143500 | | 11/2016 | |
| CN | 206141538 | | 5/2017 | |
| EP | 2554788 | | 2/2013 | |
| WO | WO-2009049471 A1 | * | 4/2009 | B61B 1/00 |

* cited by examiner

US 10,946,876 B2

CONNECTED TRANSPORTATION NETWORK SYSTEM

CROSS REFERENCE TO RELATED APPLICATION

This application claims priority to a PCT application PCT/CN2017/079069, filed on Mar. 31, 2017, which in turn takes priority of Chinese Application No. 201610218801.4, filed on Apr. 8, 2016 and Chinese Application No. 201620293606.3, filed on Apr. 8, 2016. Both the PCT application and two Chinese Applications are incorporated herein by reference in their entireties.

TECHNICAL FIELD

The invention relates to a connected transportation network system, and belongs to the field of transportation equipment and control engineering.

BACKGROUND TECHNOLOGY

At present, most modern cities are confronted with traffic jams. In order to alleviate the problem, a lot of public traffic equipment systems are usually used in urban planning and design, mainly including car traffic systems like buses and taxies, and rail traffic systems like subways and light railways.

Compared to taxies and private cars, buses and rail traffic vehicles consume lower energy per person. Therefore, energy-saving vehicle equipment is developed vigorously in many countries. However, both car traffic systems and rail traffic systems have problems of low energy utilization rate and high pollution.

For example, due to load and passenger capacity requirements, buses are usually configured with high-power engines and power devices with large-capacity fuel tanks, such that buses need to consume a lot of driving power when running to bear the power devices. Therefore, no matter how energy saving technologies are improved on buses, about 70% of kinetic energy of transportation needs to be used on the bus weight; a process of slow down, stop, start up and speed up is required at each bus stop, leading to energy waste. Besides, since buses are very large, additional lanes are required, thus occupying the area of roads, indirectly leading to traffic jams, and increasing energy waste of other vehicles in the traffic jams. Rail traffic systems have problems that the power engines are very heavy, and about 50% of kinetic energy of transportation needs to be consumed in the weight of the power engines in practical use; the process of stop and start up is also necessary at each stop, thus wasting the kinetic energy of transportation, increasing the energy consumption, and indirectly leading to environmental pollution especially in countries dominated by thermal power.

DESCRIPTION OF INVENTION

The embodiment of the invention provides a connected transportation network system which can reduce energy waste in the transportation process.

In order to achieve the above mentioned objective, the embodiment of the invention uses the following technical scheme:

A connected transportation network system constructed in a way of enclosed annular transportation (see FIG. 2): the system comprises an annular main transportation system, an annular transfer system and an annular access system (consolidation stations);

The annular main transportation system (annular rail vehicle systems): in the current embodiment, the system comprises east, south, west, north and central loops to complete the transportation required by passengers; the east, south, west and north loops run counterclockwise (opposite to the central loops), and are composed of annular-carriage trains, T-shaped rails and train driving devices;

The annular transfer system (connecting and transferring lines), comprises five transfer stations in the current embodiment, i.e., four triangular loops (a south-east connecting and transferring line, a north-east connecting and transferring line, a north-west connecting and transferring line and a south-west connecting and transferring line) and a square loop (central loop). The four triangular transferring lines run counterclockwise, while the central loop runs clockwise; all the loops are composed of annular-carriage trains, T-shaped rails and train driving devices; the sides of the transfer system close to the main transportation system run in the same direction and at the same speed as the main transportation system tangentially;

The annular access system (consolidation stations): in the current embodiment, the system is composed of 50 consolidation stations (or more/less); the consolidation stations comprise annular constantly-moving buffered docking systems and cascade speed control systems; the consolidation stations are distributed on each rail loop; the annular constantly-moving buffered vehicles are annular-carriage vehicles running on the buffered docking systems; the buffered docking systems are quasi-oblong; the sides of the buffered docking systems close to the main transportation system run in the same direction and at the same speed as the main transportation system tangentially; the cascade speed control systems are composed of multiple-grade concentric annular constantly-running speed-control belts used for cascade speed control; the annular constantly-running belts at all the grades run concentrically and unidirectionally at differential speeds (varying in cascade); the speeds at different grades vary in cascade, the grades closer to the buffered docking vehicles run at higher speed, the grades further away from the buffered docking vehicles run at lower speed, and the last grade runs at a speed near or lower than human walking speed;

The buffered docking vehicles are used to dock with the annular-carriage trains on the constantly runnmain transportation system, load passengers and/or articles to the annular-carriage trains, and/or receive passengers and/or articles unloaded from the annular-carriage trains;

The annular-carriage trains are used to load passengers and/or articles, the T-shaped rails are used to support the annular-carriage trains, and the train driving devices are used to provide traction power to the annular-carriage trains;

The annular-carriage trains run constantly on the T-shaped rails by being trailed by the train driving devices;

Wherein, the annular-carriage trains are composed of exchange platforms (1-000), rail vehicle carriages (1-001), T-shaped powered pulling plates (1-002), rail vehicle wheels (1-003) and power conveyor belts (1-004);

The T-shaped rails are composed of steel rails (2-005), rail foundations (2-006) and rail foundation frames (2-007);

The train driving devices are composed of power engines (3-008), driving wheels (3-009), hydraulic jacks (3-010) and power engine foundation frames (3-011);

The power engines (3-008) are positioned on the power engine foundation frames (3-011); the hydraulic jacks (3-010) contact the chassis of the driving wheels (3-009) and apply vertical pressure to the latter;

Wherein, the train driving devices are used to provide traction power to the annular rail vehicles, and are composed of power engines (3-008), driving wheels (3-010), hydraulic jacks (3-011) and power engine foundation frames (3-011); The power engines (3-008) are positioned on the power engine foundation frames (3-011); the driving wheels (3-009) of the power engines (3-008) are sufficiently jacked with the power conveyor belts (1-004); the driving wheels (3-009) drive the power conveyor belts (1-004) and the T-shaped powered pulling plates (1-002), and drive the annular-carriage trains to run on the rails.

In the connected traffic network system provided by the embodiment of the invention, the annular-carriage trains of the main transportation system carry most of the transportation volume at constant high speed, the train driving devices can be distributed on the annular rails of the main transportation system as per the specific design requirements, so that the train driving devices keep static and drive the annular-carriage trains of the main transportation system to run constantly at high speed, passengers get on and off the vehicles through the access system (consolidation stations), and transfer through the transfer system. The entire transportation process is completed through coordination of the three systems.

Besides, the connected traffic network system provided by the embodiment has a simple structure. By functions, the connected traffic network system is divided into the main transportation system, the access system (consolidation stations) and the transfer system, wherein the main transportation system is the main body for completing urban transportation, the consolidation stations realize passengers getting on and getting off the vehicles during perpetual running of the main transportation system, and the transfer system assists the passengers to transfer in the main transportation system; all the systems run constantly, the annular belts at all the grades of the cascade speed control systems of the consolidation stations run constantly and steadily at differential speeds, so that the passengers can get on and off the main transportation system in a self-help way, and all the systems are docked and connected with each other seamlessly. Compared to the traffic and transportation schemes using bus systems or rail traffic systems in existing technology, the train driving devices of the scheme of the embodiment are statically distributed on the annular rails of the main transportation system, thus solving the problem that most of the current traffic and transportation tools consume the kinetic energy of transportation for the vehicle weight, especially the power devices; in the scheme of the embodiment, the annular-carriage trains can keep running constantly at high speed, thus avoiding the problem of energy waste due to the process of slow down, stop, start up and speed up of most of the current traffic and transportation tools at each stop; in the scheme of the embodiment, the entire transportation process is completed through coordination of the three systems, the systems run steadily and independently, thus solving the problem of traffic jams and reducing the overall energy consumption of urban traffic.

BRIEF DESCRIPTION OF DRAWINGS

In order to make clearer of the technical schemes in embodiments of the invention, the accompanying drawings needed to be used in the embodiment will be briefly described, however, it is obvious that the accompanying drawings mentioned below are only some of the embodiments of the invention and for one of ordinary skill in the field, other drawings can be obtained based on these without creative efforts.

Among the diagrams, the symbols represent these meanings: exchange platforms (1-000), rail vehicle carriages (1-001), T-shaped powered pulling plates (1-002), rail vehicle wheels (1-003), power conveyor belts (1-004), steel rails (2-005), rail foundations (2-006), rail foundation frames (2-007), power engines (3-008), driving wheels (3-009), hydraulic jacks (3-010) and power engine foundation frames (3-011).

Specific Implementation

To help those skilled in the field better understand the technical scheme of the invention, the invention will be further explained in detail in combination with the attached drawings and specific implementation. The implementation of the invention will be described below in detail, and the example of the implementation is shown in the attached drawings, where identical or similar symbols represent identical or similar elements or those having identical or similar functions. The implementation described below in connection with the attached drawings is exemplary, and is only used to explain the invention, not construed as limiting the invention. It is apparent to those skilled in the technical field that the singular forms used herein, "one" and "the", can also contain plural forms, unless otherwise stated. It shall be further understood that, the expression "comprise" in the specification of the invention means that the characters, integrals, steps, operations, elements and/or components exist, but it shall not be excluded that one or more other characters, integrals, steps, operations, elements, components and/or combinations of them exist or are added. It shall be understood that when an element is expressed as being "connected" or "coupled" to another element, the former can be connected or coupled to the latter directly, or via intermediate elements. Besides, "connection" or "coupling" used herein can contain wireless connection or coupling. Expression "and/or" used herein contain combination of any part or all of the one or more listed correlated items. It is apparent to those skilled in the technical field that unless otherwise defined, all the terms used herein, including technical terms and scientific terms, have the same meanings as what are understood by those of ordinary skills in the field of the invention. It shall also be understood that terms defined in general dictionaries shall be understood as having meanings consistent with the meanings in the context of the existing technology, and would not be explained by ideal or excessively formal meanings unless defined like here.

The embodiment of the invention provides a connected transportation network system, as shown in FIGS. 1-5, composed of a main transportation system (or "annular main transportation system"), a transfer system (or "annular transfer system") and an access system (or "annular access system", including consolidation stations).

Figure 2:
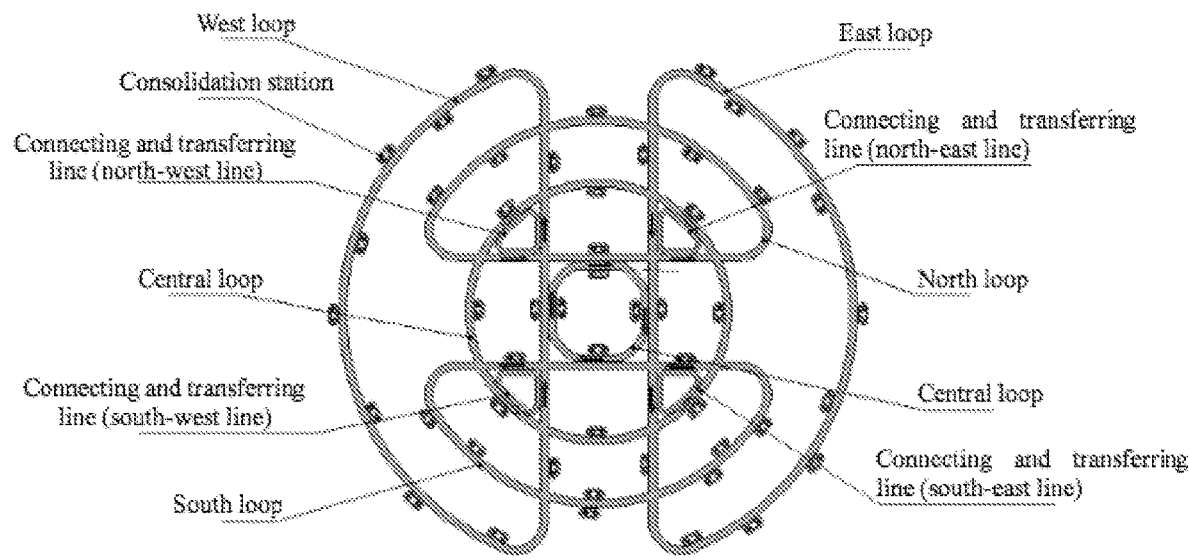
FIG. 2 is the specific structure diagram of the main transportation system of the connected traffic network system provided by the embodiment of the invention.

The main transportation system comprises east, south, west, north and central loops, wherein the east, south, west and north loops respectively run counterclockwise, the central loop runs clockwise, and the east, south, west and north loops and the central loop are respectively composed of annular-carriage trains, T-shaped rails and train driving devices. As shown in FIG. 2, the main transportation system in the current embodiment comprises east, south, west, north and central loops to complete running task required by passengers; the east, south, west and north loops run counterclockwise (opposite to the central loops which run clockwise).

The transfer system is composed of five transfer stations comprising four triangular loops, a south-east connecting and transferring line (or "a south-east section of a connecting and transferring line"), a north-east connecting and transferring line (or "a north-east section of a connecting and transferring line"), a north-west connecting and transferring line (or "a north-west section of a connecting and transferring line") and a south-west connecting and transferring line (or "a south-west section of a connecting and transferring line"), as well as a square central loop, wherein the sides of the transfer system close to the main transportation system are used as passenger transfer sections and run in the same direction and at the same speed as the main transportation system tangentially, and the south-east connecting and transferring line, the north-east connecting and transferring line, the north-west connecting and transferring line, the south-west connecting and transferring line and the central loop are respectively composed of annular-carriage trains, T-shaped rails and train driving devices; as shown in FIG. 2, in the embodiment, the transfer system comprises five transfer stations, i.e., four triangular loops and one square loop (central loop). The four triangular transferring lines run counterclockwise, while the central loop runs clockwise; all the loops are composed of annular-carriage trains, T-shaped rails and train driving devices; the sides (used as passenger transfer sections) of the transfer system close to the main transportation system run in the same direction and at the same speed as the main transportation system tangentially.

The access system is composed of designated number of consolidation stations comprising buffered docking systems and cascade speed control systems; the buffered docking systems are quasi-oblong, the sides of the buffered docking systems close to the main transportation system run in the same direction and at the same speed as the main transportation system tangentially, and are used as parts for exchanging passengers between the access system and the main transportation system; the cascade speed control systems are composed of multiple-grade concentric annular rubber belts running at constant speed, wherein the rubber belts closer to buffered docking vehicles run at higher speed, the rubber belts further away from buffered docking vehicles run at lower speed, the grades running at the lowest speed runs at a speed close to or lower than the normal walking speed, and the semicircular sections of the outermost annular belts close to the buffered docking systems run in the same direction and at the same speed as the buffered docking systems tangentially; As shown in FIGS. 1-5, the access system in the embodiment can be composed of 50 consolidation stations (or more/less) which are distributed on the annular main transportation lines; the annular constantly-moving buffer vehicles have the same structures as the main transportation system; the perpetual running belts of the cascade speed control systems closer to buffered docking vehicles run at higher speed, the perpetual running belts further away from buffered docking vehicles run at lower speed, the last grades run at a speed close to or lower than the normal human walking speed; the semicircular sections of the outermost annular belts of the cascade speed control systems close to the buffered docking systems are used as transfer sections for passengers to go in and out of the buffered docking systems, and run in the same direction and at the same speed as the buffered docking systems tangentially with small distances; the passengers enter the buffered docking systems by changing the speed through the cascade speed control systems.

The buffered docking systems are composed of annular constantly-moving buffer vehicles, T-shaped rails and train driving devices, the sides of the annular-carriage trains of the buffered docking systems close to the main transportation system are used as transfer sections for passengers to go in and out of the main transportation system, and run in the same direction and at the same speed as the main transportation system tangentially with small distances.

The annular constantly-moving buffer vehicles have the same structures as the annular-carriage trains of the main transportation system, are used to dock with the annular-carriage trains of the main transportation system, load passengers and/or articles to the annular-carriage trains, and/or receive passengers and/or articles unloaded from the annular-carriage trains.

The annular-carriage trains are used to load passengers and/or articles, the T-shaped rails are used to support the annular-carriage trains, and the train driving devices are used to provide traction power to the annular-carriage trains, so that the annular-carriage trains run constantly on the T-shaped rails by being trailed by the train driving devices.

Figure 3:
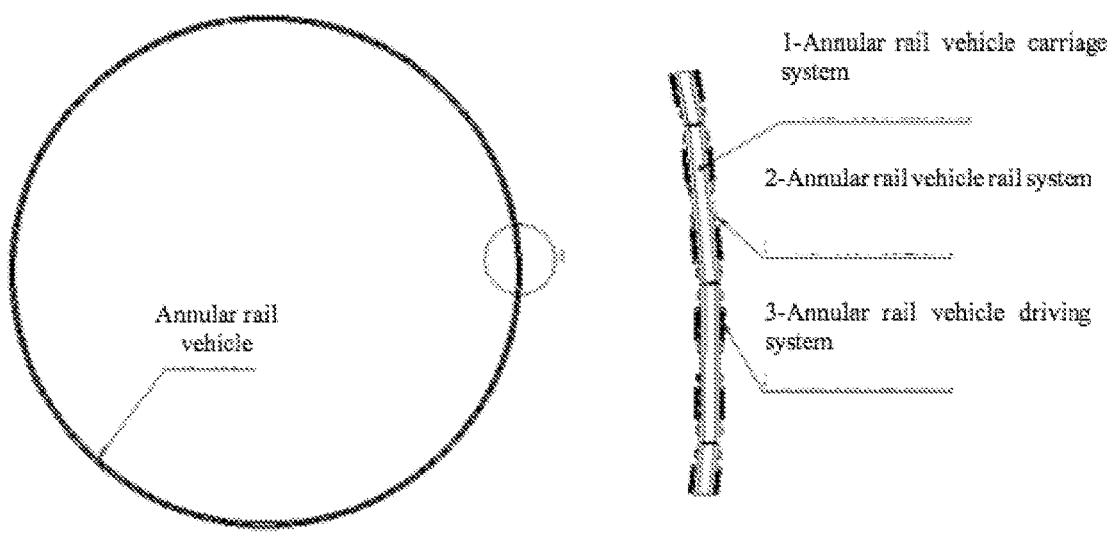
FIG. 3 is the composition diagram of the main transportation system (annular rail vehicle systems) provided by the embodiment of the invention.
Figure 4:
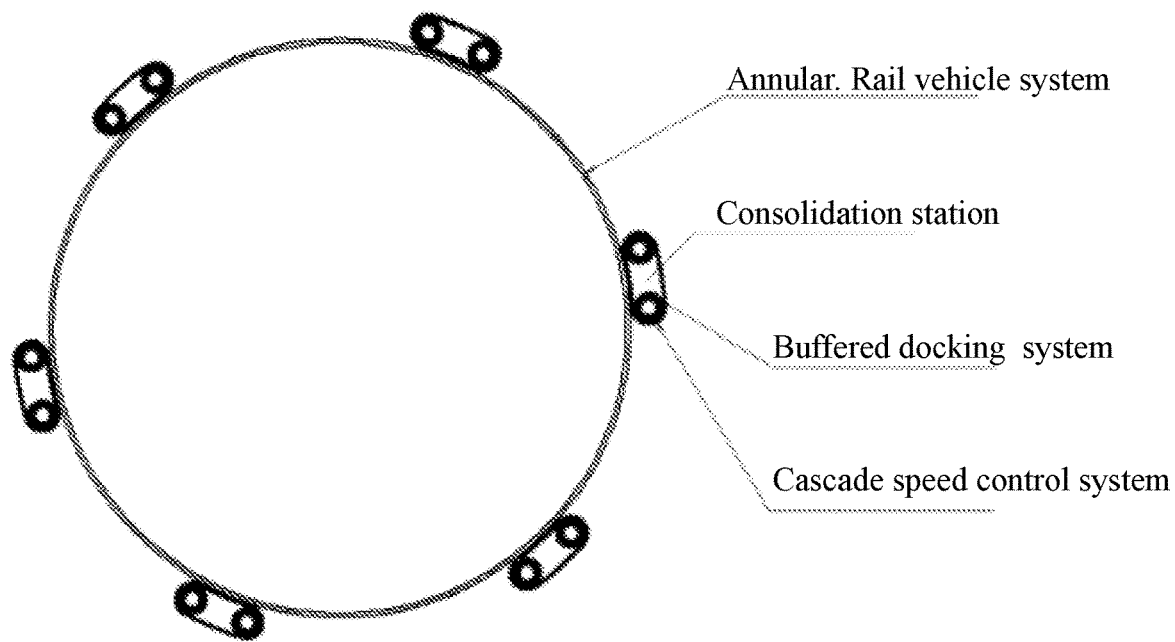
FIG. 4 is the layout and composition diagram of the consolidation stations in the main transportation system in the connected traffic network system provided by the embodiment of the invention.
Figure 5:
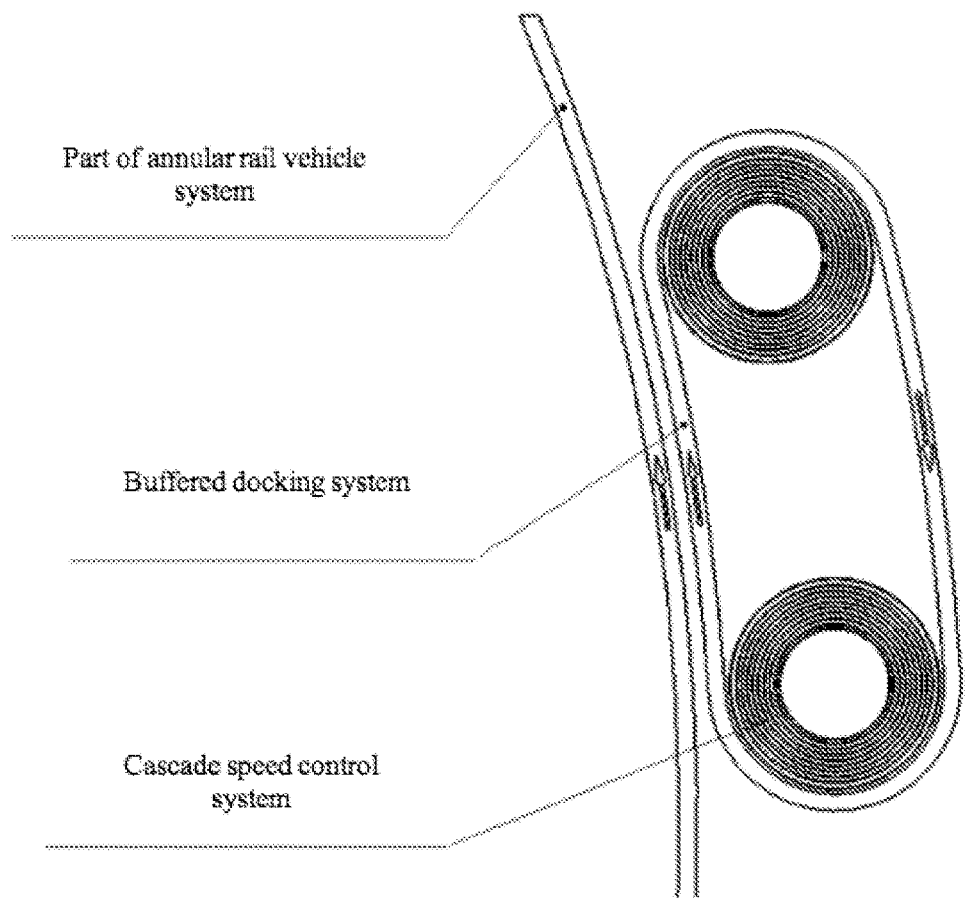
FIG. 5 is the composition diagram of the consolidation stations in the connected traffic network system provided by the embodiment of the invention.

For example, as shown in FIGS. 1-5, the structures of the buffered docking systems of the main transportation system, the transfer system and the consolidation stations can be designed as annular rail vehicles, i.e., static vehicles are used as the train driving devices driving the trains to make annular movements on the rails; in the embodiment, the buffered docking systems of the main transportation system, the transfer system and the consolidation stations can be designed as enclosed annular rail vehicle systems, and the train driving devices are distributed on the annular rails of the main transportation system as per the specific design requirements, wherein, the cross sections of the annular rails are design to be T-shaped. Therefore, the train driving devices are static and do not consume kinetic energy compared to the existing technology. Besides, the annular-carriage trains run constantly on the enclosed annular rails by being driven by the train driving devices. As shown in FIGS. 3 and 4, the consolidation stations comprise buffered docking systems (i.e., annular constantly-moving buffer vehicles) and cascade speed control systems; the consolidation stations are distributed on each rail loop; the annular constantly-moving buffered vehicles are annular-carriage vehicles running on the rails of the buffered docking systems; the buffered docking systems are quasi-oblong; the sides of the buffered docking systems close to the main transportation system run in the same direction and at the same speed as the main transportation system tangentially, so that the sides are used as transfer points where the passengers go in or out of the main transportation system, and seamless exchange of the passengers between the main transportation system and the consolidation stations is realized in the dynamic process; the cascade speed control systems are composed of multiple-grade concentric annular speed-control rails used for cascade speed control.

Wherein, the buffered docking systems are transfer and buffer stations for passengers to go from the main transportation system to the cascade speed control systems, the cascade speed control systems can be composed of a plurality of constantly-moving concentric annular consolidation belts which run constantly at constant speeds varying in cascade from the inside to the outside; the passengers can get on the vehicles in a self-help way (speed up in a self-help way) and get off the vehicles in a self-help way (slow down in a self-help way) through the cascade speed control systems, so that the passengers can go in and out of the dynamic annular-carriage trains of the main transportation system in a self-help way through speed control and buffering of the consolidation stations.

In the preferred scheme of the embodiment, the buffered docking systems can be annular enclosed transportation lines, and can be designed in the same way as the annular rail vehicles of the main transportation system; the running speed of the buffered docking systems is the same as the rated running speed of the trains of the main transportation system, and the same as the outermost annular constantly-moving consolidation belts of the cascade speed control systems;

Shapes of the buffered docking systems: the exchange parts of the annular constantly-moving buffer vehicles with the annular rail vehicles of the main transportation system are tangent to each other in a quasi-linear way, and the passenger exchange parts of the docked buffering systems with the outermost annular constantly-moving consolidation belts of the cascade speed control systems are quasi-circular; the length of the passenger exchange parts of the outermost annular constantly-moving consolidation belts of the cascade speed control systems: the sum of the two tangent parts of the passenger exchange parts is as long as the passenger exchange parts of the annular rail vehicles, to balance the incoming and outgoing amount.

In the preferred scheme of the embodiment, the cascade speed control systems are composed of a plurality of grades of concentric annular constantly-moving consolidation belts in such structure: the cascade speed control systems are composed of a plurality of annular constantly-moving consolidation belts arranged concentrically and closely at equal intervals, each annular constantly-moving consolidation belt run independently at differential speeds, and corresponds to a gradually different speed; specifically, grade number and size of the cascade speed control systems: the cascade speed control systems are composed of a plurality of annular constantly-moving consolidation belts arranged concentrically and closely at equal intervals, the number of the consolidation belts is dependent on the speed variation required, all the speed changes are the same, and the larger absolute speed change value means more grades. The width and running radius of the consolidation belts are determined as actually needed; the annular constantly-moving consolidation belts run independently but with interrelation, and the edge distance of every two adjacent consolidation belts is controlled within a small range (e.g., 10-15 mm, to guarantee the passengers' walking safety). The annular constantly-moving consolidation belts run independently but with interrelation; the innermost belts run at the lowest speed, each outer grade runs at a speed which is one level higher than the inner grade, the edge distance of every two adjacent consolidation belts is controlled within a small range, the annular constantly-moving consolidation belts run at different speeds, the innermost belts run at the lowest speed, and the outer belts run at higher speed; according to the walking speed of ordinary people, every two adjacent consolidation belts run with a speed difference of 0.8 m/sec, equivalent to 2.88 km/hr. The plurality of grades of annular constantly-moving consolidation belts run concentrically and unidirectionally at differential speeds, thus realizing cascade speed changes; the innermost annular constantly-moving consolidation belts run at the lowest speed (below 2.88 km/hr), and the outermost annular constantly-moving consolidation belts run at the highest speed, which is the same as the speed of the buffered docking systems and the annular rail vehicles. The structure of each annular constantly-moving consolidation belt at least comprises a consolidation belt (equivalent to the carriage of the annular constantly-moving buffer vehicle), a rail and a power system, wherein the consolidation belt runs at the annular rail at constant speed, can be designed as a rubber belt, and is circular shaped; the rail runs in the same path of the consolidation belt; dependent on the design, the power system can be implemented in various ways, the high speed part can be designed by referencing the rail design of the annular constantly-moving buffer vehicle, and the low speed part can be designed in various ways (e.g., the motor, gear and rack driving modes or other driving modes).

In the operation process, the annular constantly-moving buffer vehicles of the consolidation stations run constantly in the same direction and at the same speed as the annular rail vehicles, to realize dynamic (equal-speed) passenger exchange with the annular rail vehicles, so that the annular rail vehicles of the main transportation system can run normally, without being started up or stopped when the passengers get on or off. The annular consolidation belts run constantly at differential speeds, the passengers walk in a self-help way to realize speed changes, i.e., the speed is increased when the passengers get on the vehicles, and reduced when the passengers get off the vehicles.

In general, the scheme can improve the transportation efficiency of urban traffic by 5-10 times, thus solving the problem of energy waste due to the process of slow down, stop, start up and speed up of most of the current traffic and transportation tools at each stop. In addition, motor vehicles on the road systems are dispersive presently, each individual vehicle run independently and is influenced by various factors when running, like getting on/off, red or green traffic lights, route changing, peak hours, cross roads. Each individual vehicle wants to achieve high efficiency, leading to severe traffic jams, and finally low overall transportation efficiency, high pollution, high energy consumption and many traffic accidents.

In the scheme of the embodiment, the whole transportation process is completed through coordination of the three types of systems. The systems run independently and constantly, and can be connected to each other. The passengers can arrive at any position in the entire traffic network. The start, stop and speed changes of the entire system are uniform, and the speed is changed under centralized control, thus solving the traffic jams problem, reducing urban traffic energy consumption and improving the urban traffic efficiency.

In the embodiment, the main transportation system, the transfer system and the buffered docking systems of the consolidation stations can be the annular rail vehicle systems as shown in FIG. 3.

Figure 6:
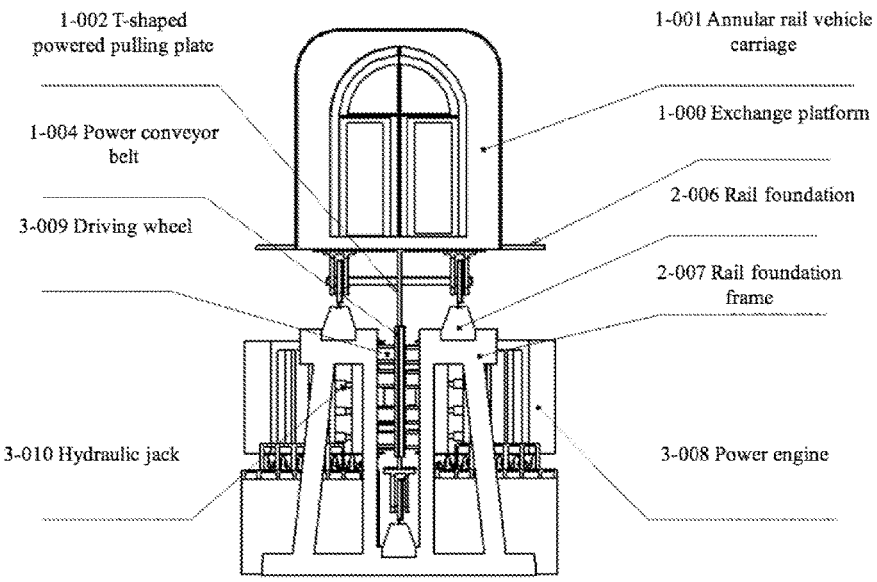
FIG. 6 is the cross-section structure diagram of the annular rail vehicle systems provided by the embodiment of the invention.
Figure 7:
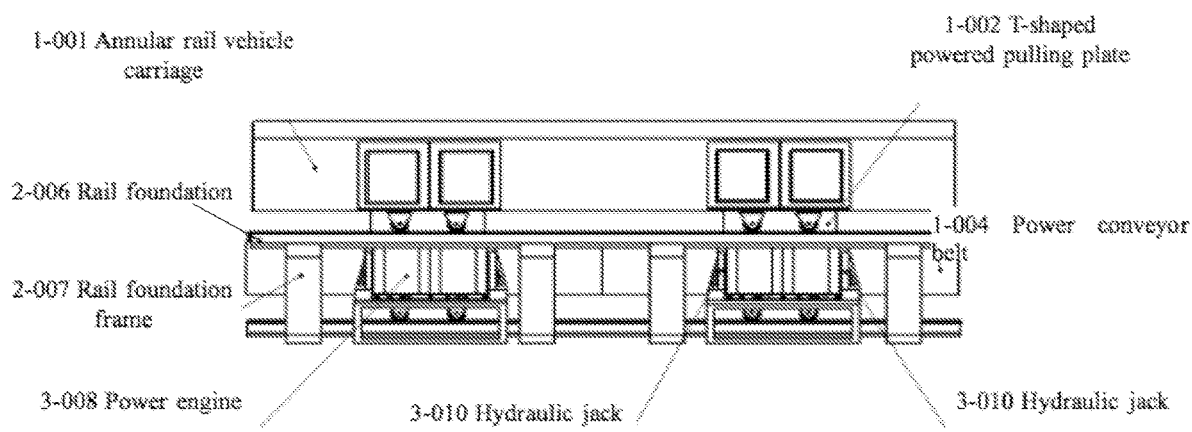
FIG. 7 is the side structure diagram of the annular rail vehicle systems provided by the embodiment of the invention.
Figure 8:
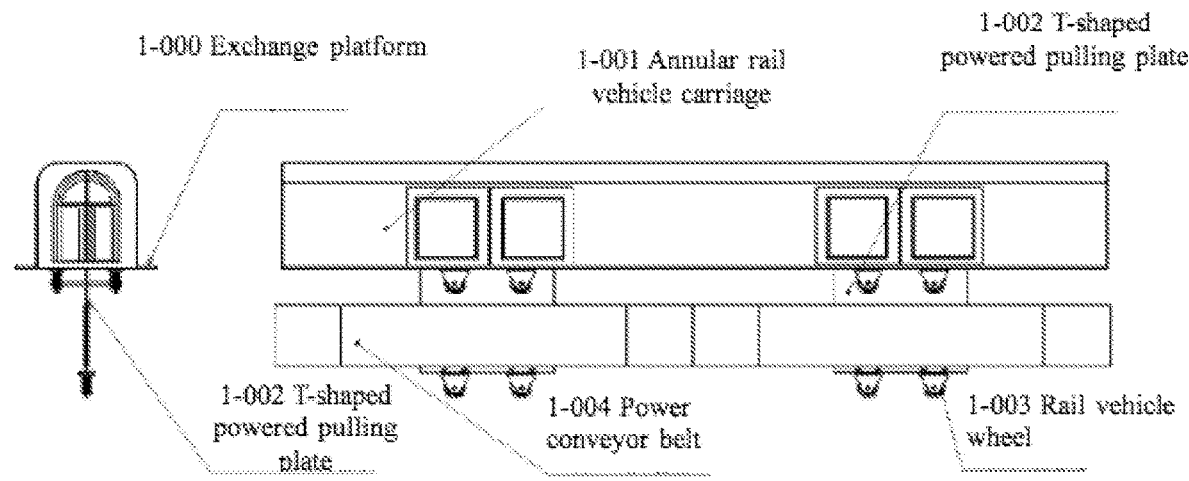
FIG. 8 is the structure diagram of the annular-carriage trains provided by the embodiment of the invention.
Figure 9:
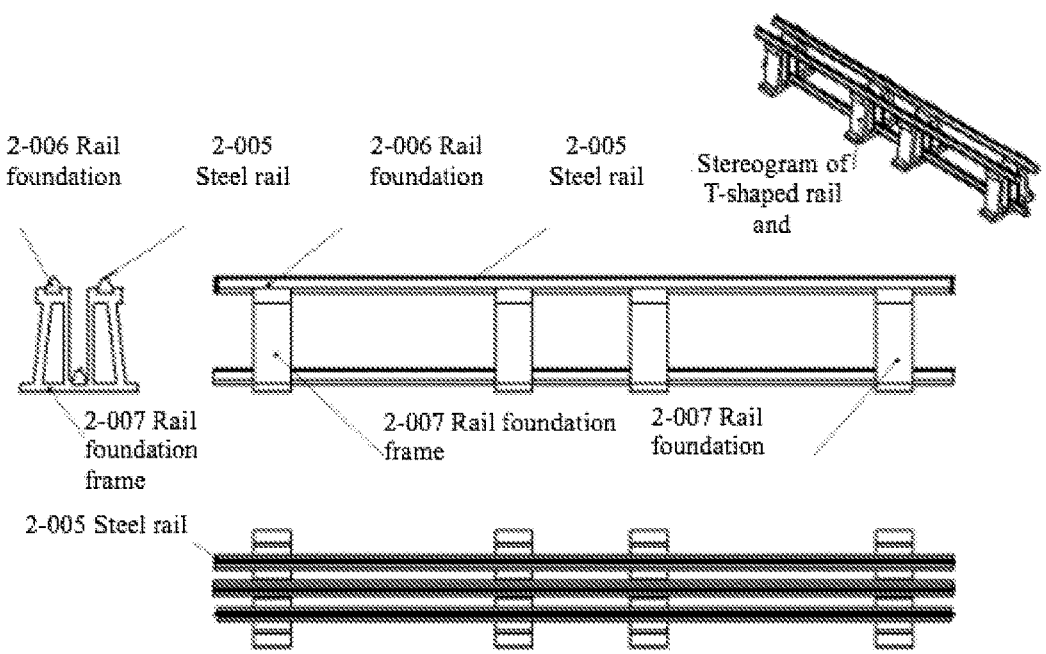
FIG. 9 is the structure diagram of the T-shaped rails provided by the embodiment of the invention.
Figure 10:
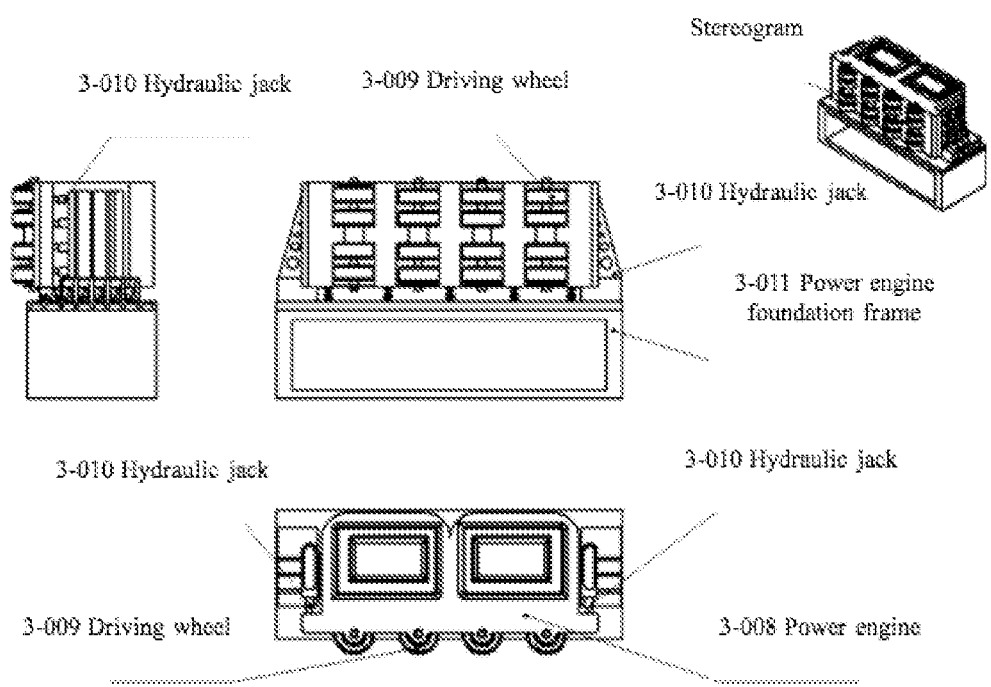
FIG. 10 is the structure diagram of the train driving devices provided by the embodiment of the invention.

Wherein, as shown in FIGS. 6-8, the annular-carriage trains are composed of exchange platforms (1-000), rail vehicle carriages (1-001), T-shaped powered pulling plates (1-002), rail vehicle wheels (1-003) and power conveyor belts (1-004);

As shown in FIG. 9, the T-shaped rails are composed of steel rails (2-005), rail foundations (2-006) and rail foundation frames (2-007);

As shown in FIG. 10, the train driving devices are used to provide traction power, and are composed of power engines (3-008), driving wheels (3-009), hydraulic jacks (3-010) and power engine foundation frames (3-011); the power engines (3-008) are positioned on the power engine foundation frames (3-011); the hydraulic jacks (3-010) contact the chassis of the driving wheels (3-009) and apply vertical pressure to the latter, and the driving wheels (3-009) of the power engines (3-008) are sufficiently provided with the power conveyor belts (1-004).

Wherein, the train driving devices are used to provide traction power to the annular rail vehicles. The driving wheels (3-009) drive the power conveyor belts (1-004) and the T-shaped powered pulling plates (1-002), and drive the annular-carriage trains to run on the rails. The train driving devices are uniformly distributed at each point on the annular lines, and are static relative to the constantly running vehicles. When the traction power needs to be adjusted, the driving power is provided to the annular rail vehicles by adjusting the friction force between the driving wheels (3-009) and the power conveyor belts (1-004). The trains can be started up or stopped by adjusting the power engines (3-008) through frequency conversion. Therefore, the power systems can be separated from the constantly running trains and remain static without consuming any kinetic energy. In normal conditions, the annular rail vehicles run constantly, the main transportation system are not started up or stopped when the passengers get on or off, and the passengers get on and off the vehicles through the access system (consolidation stations). The overall transportation volume of the system can also be adjusted by adjusting the speed at which the annular-carriage trains are driven by the train driving devices.

In the embodiment, the access system comprises inner systems and outer systems, wherein the inner systems are positioned on the inner loops of the main transportation system, and the outer systems are positioned on the outer loops of the main transportation system. Each grade of the cascade speed control system of each consolidation station runs in the same direction as the corresponding buffered docking system.

Specifically, system structure: the system comprises the main transportation system, the annular constantly-moving buffer vehicle systems in the access system and the transfer system, which are all composed of annular-carriage trains, annular T-shaped rails and a plurality of train driving devices, wherein the cascade speed control systems in the access system are composed of annular (rubber) belts, rails and power parts. The annular belts run on the respective rails at constant speed in an enclosed loop way. The power parts can be implemented in various ways, the high speed parts can be designed by referencing the annular rail vehicles of the main transportation system, and the low speed parts can be designed in various ways (e.g., the motor, gear and rack driving mode or other driving modes).

Further, the main transportation system, the transfer system and the access system are connected with each other, have enclosed annular structures and run constantly. The passengers can go in or out of the main transportation system in a self-help way through the access system (consolidation stations), and can transfer among all the running lines in the main transportation system in a self-help way through the transfer system (transferring and connecting stations). The buffered docking systems of the main transportation system, the transfer system and the access system (consolidation stations) run at the same speed, the speeds at different grades of the cascade speed control systems of the access system (consolidation stations) vary in cascade, the grades closer to the buffered docking vehicles run at higher speed, the grades further away from the buffered docking vehicles run at lower speed, and the last grade runs at a speed near or lower than human walking speed.

Further, each subsystem in the connected transportation network system is annular, runs constantly, and connected with the adjacent subsystem, and the exchanging and connecting parts of the subsystems run in the same direction tangentially, with a mutual distance of 10-15 mm. Connection method of the entire traffic network system: the annular belts of the cascade speed control systems run at speeds varying in cascade, and the speed difference is controlled within ordinary people's walking speed, so as to ensure that the passengers go to all the annular belts of the cascade speed control systems; other subsystems (except the cascade speed control systems) run at the same speed and in the same direction, so as to ensure that the passengers go to any position in the entire traffic network system in a self-help way due to the interconnection.

Figure 1:
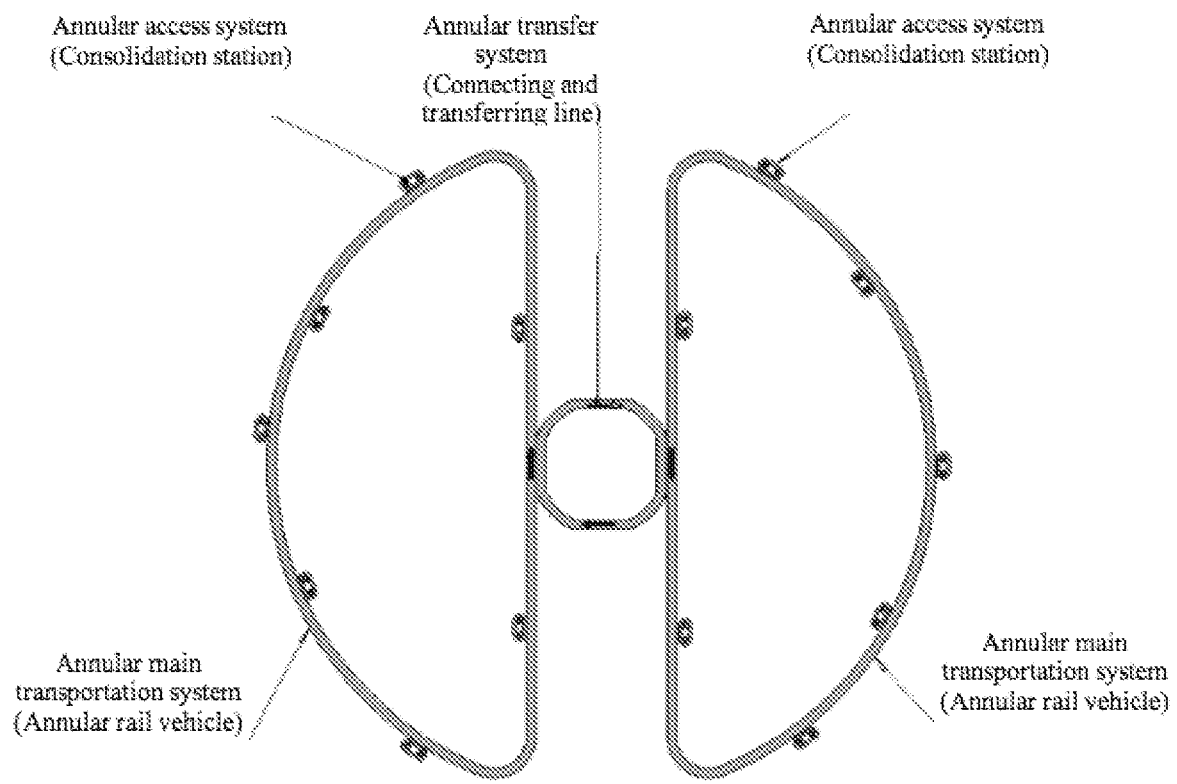
FIG. 1 is the constitutional and conceptual model diagram of the annular network provided by the embodiment of the invention.

Specifically, the embodiment provides a preferred structure of the connected traffic network system as shown in FIG. 1, wherein the main transportation system comprises at least five annular main transportation lines (annular rail vehicle systems); the transfer system comprises at least four triangular loop shaped connecting and transferring line and a central loop shaped connecting and transferring line, wherein the connecting and transferring lines have annular structures in certain shapes, all the sides of the connecting and transferring lines run at the same speed in the same direction as all the lines of the main transportation system tangentially, so that the passengers can transfer to other annular constantly-running lines in a self-help way via the exchange platforms of the connecting and transferring lines; the annular main transportation lines of the main transportation system are connected to each other via the connecting and transferring lines. The annular access system (consolidation stations) is arranged on the annular main transportation lines, so that the passengers can go in and out of the connected traffic network system in a self-help way, and all the annular main transportation lines, al the transferring lines and all the consolidation stations are connected to each other.

The specific structure of FIG. 1 is shown in Table 1:

TABLE 1

| Urban Connected Traffic Network System | | | | | |
|---|---|---|---|---|---|
| | System Composition | | Function | Quantity | Shape |
| Annular main transportation system | Annular transportation lines | Central loop | As the main body of urban traffic and transportation, all the lines run counterclockwise in a perpetual loop way; the system speed can be adjusted according to changes of the traffic flow to achieve the target of effective transportation. | 1 | Loop |
| | | North loop | | 1 | Half-loop |
| | | South loop | | 1 | Half-loop |
| | | West loop | | 1 | Half-loop |
| | | East loop | | 1 | Half-loop |
| Annular transfer system | The passengers can transfer from one loop to the other three loops (three options) | North-east connecting loop | All the loops run counterclockwise at the same speed in the same direction as the tangent sections of the annular transportation lines to connect all the annular transportation lines (central, east, south, west and north loops) and realize interconnection of the annular transportation lines. | 1 | Triangular loop |
| | | South-east connecting loop | | 1 | Triangular loop |
| | | South-west connecting loop | | 1 | Triangular loop |
| | | North-west connecting loop | | 1 | Triangular loop |
| | The passengers can transfer from one loop to the other four loops (four options) | Central loop | The loop runs clockwise at the same speed in the same direction as the tangent sections of the annular transportation lines, being able to connect to the east, west, south and north loops and having a central buffering function. | 1 | Square loop |
| Annular access system | Consolidation stations | Annular buffered transferring vehicles | Used as buffers between the annular trains and the cascade speed control systems | A plurality | Rectangular loop |
| | | Cascade speed control consolidation belts | Used for incoming and outgoing passengers to realize self-help speed changes through the system | | Concentric round loops |

The structure comprises 5 transportation lines in the main transportation system, the central, north, south, west and east loops; a certain number of consolidation stations distributed in the whole connected traffic network system; 5 transferring lines, north-east, south-east, south-west and north-west connecting loops and a central loop. Specifically, the 5 transferring lines realize interconnection of the 5 main transportation lines. The shapes and locations of the transferring lines are shown in FIG. 2. In the four quasi-triangular loop shaped transferring lines, the three sides run in the same direction at the same speed as three main transportation lines tangentially, each side is parallel to each main transportation line, and the mutual distance is controlled within a small range, to guarantee the passengers' access safety on the transferring lines and the main transportation lines. The central loop shaped transferring line is quadrilateral loop shaped, runs in the same direction at the same speed as the annular constantly-running transportation lines to connect to the east, west, south and north annular loops; the four sides thereof run in the same direction at the same speed as the four main transportation lines tangentially, each side is parallel to each main transportation line, and the mutual distance is controlled within a small range, to guarantee the passengers' access safety on the transferring lines and the main transportation lines; since being at the center of the system, the line also has a central buffering function.

The detailed running method of the connected traffic network system shown in FIG. 2: the main transportation lines and the transferring lines are adjusted to run steadily at rated constant speed according to the transportation volume; the annular constantly-moving buffer vehicles of the consolidation stations run at the same speed as the main transportation system; the cascade speed control systems of the consolidation stations select the number of grades to be started up of the multi-grade annular constantly-moving consolidation belts according to the system speed, and automatically adjust the speeds of the consolidation belts.

Passengers getting on: the passengers enter from the innermost side of the annular cascade speed control systems of the consolidation stations, walk into the innermost annular consolidation belts of the cascade speed control systems, gradually move to the outer sides, enter the annular buffered docking vehicles of the consolidation stations, and enter the dynamic trains of the main transportation system via the exchange platforms of the annular buffered docking vehicles to get on the vehicles; passengers getting off: the passengers enter the annular buffered docking vehicles of the consolidation stations via the exchange platforms from the dynamic trains, enter the cascade speed control systems via the exchange platforms of the annular constantly-moving buffer vehicles to get on the vehicles in a self-help way, and gradually move to the center from the outermost sides of the annular consolidation belts, to get off the vehicles.

The connected traffic network system provided by the embodiment of the invention has simple structure. By functions, the connected traffic network system is divided into the main transportation system, the access system (consolidation stations) and the transfer system, wherein the main transportation system is the main body for completing urban transportation, the consolidation stations realize passengers getting on and getting off the vehicles during perpetual running of the main transportation system, and the transfer system assists the passengers to transfer in the main transportation system; all the systems run constantly, the annular belts at all the grades of the cascade speed control systems of the consolidation stations run constantly and steadily at differential speeds, so that the passengers can get on and off the main transportation system in a self-help way, and all the systems are docked and connected with each other seamlessly. The systems run steadily and independently from each other, and the entire transportation process is completed through coordination of the three systems.

In the existing urban public traffic system, every person arrives at the destination mainly by using specific traffic tools and different routes. The energy consumption is increased due to complex routes, uncontrolled accidents, traffic jams, red and green traffic lights, many passengers getting on and off during vehicle operation, and repeated start and stop of the vehicles. In the scheme of the embodiment, the train driving devices are statically distributed on the annular rails of the main transportation system, thus solving the problem that most of the current traffic and transportation tools consume the kinetic energy of transportation for the vehicle weight, especially the power devices. In the scheme of the embodiment, the annular rail vehicle systems run on planned routes, the annular-carriage trains can run constantly at high speed without stopping during transportation, and the speed of the annular-carriage trains is controllable, thus the overall traffic flow is controllable.

In the connected traffic network system provided by the embodiment of the invention, the annular-carriage trains of the main transportation system carry most of the transportation volume at constant high speed, the train driving devices can be distributed on the annular rails of the main transportation system as per the specific design requirements, so that the train driving devices keep static and drive the annular-carriage trains of the main transportation system to run constantly at high speed, passengers get on and off the vehicles through the access system (consolidation stations), and transfer through the transfer system. The entire transportation process is completed through coordination of the three systems. Besides, the connected traffic network system provided by the embodiment has a simple structure. By functions, the connected traffic network system is divided into the main transportation system, the access system (consolidation stations) and the transfer system, wherein the main transportation system is the main body for completing urban transportation, the consolidation stations realize passengers getting on and getting off the vehicles during perpetual running of the main transportation system, and the transfer system assists the passengers to transfer in the main transportation system; all the systems run constantly, the annular belts at all the grades of the cascade speed control systems of the consolidation stations run constantly and steadily at differential speeds, so that the passengers can get on and off the main transportation system in a self-help way, and all the systems are docked and connected with each other seamlessly. Compared to the traffic and transportation schemes using bus systems or rail traffic systems in existing technology, the train driving devices of the scheme of the embodiment are statically distributed on the annular rails of the main transportation system, thus solving the problem that most of the current traffic and transportation tools consume the kinetic energy of transportation for the vehicle weight, especially the power devices; in the scheme of the embodiment, the annular-carriage trains can keep running constantly at high speed, thus avoiding the problem of energy waste due to the process of slow down, stop, start up and speed up of most of the current traffic and transportation tools at each stop; in the scheme of the embodiment, the entire transportation process is completed through coordination of the three systems, the systems run steadily and independently, thus solving traffic jams and reducing the overall energy consumption of urban traffic.

Every embodiment is described progressively in the specification, the identical and similar parts among different embodiments can be referenced mutually, and every embodiment mainly describes differences from other embodiments. Particularly, since being basically similar to method embodiments, the equipment embodiments are described simply. See part of the description of the method embodiments for relevant parts. The above description is only specific implementation of the invention, but the protection scope of the invention is not limited herein. Variations or replacements within the technical scope disclosed by the invention, which can easily be come up with by any one skilled in the technical field, all fall in the protection scope of the invention. Therefore, the protection scope of the invention shall be limited by the protection scope of the claim.

The invention claimed is:

1. A connected transportation network system, characterized in that, the system comprises
a main transportation system, a transfer system and an access system;
the main transportation system comprises east, south, west, north and central loops, wherein
the east, south, west and north loops respectively run counterclockwise,
the central loop runs clockwise,
and the east, south, west and north loops and the central loop are respectively comprised of annular-carriage trains, T-shaped rails and train driving devices;
the transfer system is comprised of five transfer stations, said five transfer stations includes,
a south-east connecting and transferring line,
a north-east connecting and transferring line,
a north-west connecting and transferring line and a south-west connecting and transferring line,
forming four triangular loops and a square central loop,
wherein sides of the transfer system close to the main transportation system are used as passenger transfer sections and run in the same direction and at the same speed as the main transportation system tangentially, and the south-east connecting and transferring line, the north-east connecting and transferring line, the north-west connecting and transferring line, the south-west connecting and transferring line and the central loop are respectively comprised of the annular-carriage trains, the T-shaped rails and train driving devices;
the access system is comprised of
a designated number of consolidation stations, said consolidation stations comprising buffered docking systems and cascade speed control systems;
the buffered docking systems are oblong, sides of the buffered docking systems close to the main transportation system run in the same direction and at the same speed as the main transportation system tangentially, and are used as parts for exchanging passengers between the access system and the main transportation system;
the cascade speed control systems are comprised of
multi-stage concentric annular rubber belts, each rubber belt running at a constant speed,
wherein the rubber belts closer to buffered docking vehicles run at a higher speed, the rubber belts farther away from buffered docking vehicles run at a lower speed, the rubber belts running at the lowest speed run at a speed close to or lower than a normal walking speed, and semicircular sections of the outermost annular belts of the cascade speed control systems close to the buffered docking systems run in the same direction and at the same speed as the buffered docking systems tangentially;
the buffered docking systems are comprised of annular constantly-moving buffer vehicles, the T-shaped rails and train driving devices, sides of the annular-carriage trains of the buffered docking systems, close to the main transportation system, are used as transfer sections for passengers to enter and leave the main transportation system, and run in the same direction and tangentially at the same speed as the main transportation system;
the annular constantly-moving buffer vehicles have the same structures as the annular-carriage trains of the main transportation system, are used to dock with the annular-carriage trains of the main transportation system, load passengers and/or articles to the annular-carriage trains, and/or receive passengers and/or articles unloaded from the annular-carriage trains;
the annular-carriage trains are used to load passengers and/or articles, the T-shaped rails are used to support the annular-carriage trains, and the train driving devices are used to provide traction power to the annular-carriage trains, so that the annular-carriage trains run constantly on the T-shaped rails while being hauled by the train driving devices.

2. The connected transportation network system according to claim 1, characterized in that,
the annular-carriage trains are comprised of exchange platforms (1-000), rail vehicle carriages (1-001), T-shaped powered pulling plates (1-002), rail vehicle wheels (1-003) and power conveyor belts (1-004);
the T-shaped rails are comprised of steel rails (2-005), rail foundations (2-006) and rail foundation frames (2-007);
the train driving devices are used to provide traction power, and are comprised of power engines (3-008), driving wheels (3-009), hydraulic jacks (3-010) and power engine foundation frames (3-011); the power engines (3-008) are positioned on the power engine foundation frames (3-011); the hydraulic jacks (3-010) contact the chassis of the driving wheels (3-009) and apply vertical pressure to the latter, and the driving wheels (3-009) are jacked with the power conveyor belts (1-004).

3. The connected transportation network system according to claim 1, characterized in that, the access system comprises inner systems and outer systems, wherein the inner systems are positioned on inner loops of the main transportation system, and outer systems are positioned on the outer loops of the main transportation system.

4. The connected transportation network system according to claim 1, characterized in that, running direction of each grade of the cascade speed control system of each consolidation station is the same as direction as the corresponding buffered docking system.

5. The connected transportation network system according to claim 1, characterized in that,
the main transportation system, the transfer system and the access system are connected with each other, have enclosed annular structures, and run constantly.

6. The connected transportation network system according to claim 5, characterized in that, subsystem in the connected transportation network system is annular, runs constantly, and connected with the adjacent subsystem, and exchanging and connecting parts of the subsystems run in the same direction tangentially, with a mutual distance of 10-15 mm.

* * * * *